(12) United States Patent
Huh

(10) Patent No.: US 11,066,071 B2
(45) Date of Patent: Jul. 20, 2021

(54) COASTING CONTROL METHOD BASED ON OVERSPEED RESPONSE AND ECO-FRIENDLY VEHICLE EMPLOYING THE SAME

(71) Applicants: Hyundai Motor Company, Seoul (KR); Kia Motors Corporation, Seoul (KR)

(72) Inventor: Jee-Wook Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 187 days.

(21) Appl. No.: 16/179,897

(22) Filed: Nov. 3, 2018

(65) Prior Publication Data

US 2019/0193732 A1     Jun. 27, 2019

(30) Foreign Application Priority Data

Dec. 27, 2017 (KR) .................. 10-2017-0181102

(51) Int. Cl.
*B60W 30/00*     (2006.01)
*B60W 30/14*     (2006.01)
*B60W 10/08*     (2006.01)
*B60W 30/18*     (2012.01)
*B60W 40/105*    (2012.01)

(52) U.S. Cl.
CPC ......... *B60W 30/143* (2013.01); *B60W 10/08* (2013.01); *B60W 30/18109* (2013.01); *B60W 40/105* (2013.01); *B60W 2510/083* (2013.01); *B60W 2520/10* (2013.01); *B60W 2720/10* (2013.01)

(58) Field of Classification Search
CPC ............. B60W 30/143; B60W 10/08; B60W 30/18109; B60W 40/105; B60W 2510/083; B60W 2520/10; B60W 2720/10
USPC .......................................... 701/93
See application file for complete search history.

(56) References Cited

U.S. PATENT DOCUMENTS

| 2012/0101698 A1* | 4/2012 | Eriksson | B60W 30/143 701/53 |
| 2015/0105993 A1* | 4/2015 | Um | B60W 30/146 701/93 |
| 2016/0082942 A1* | 3/2016 | Park | B60W 20/00 701/22 |

FOREIGN PATENT DOCUMENTS

| JP | H07-182598 A | 7/1995 |
| JP | 2016-215934 A | 12/2016 |
| KR | 101115151 B1 | 2/2012 |
| KR | 2015-0009725 A | 1/2015 |
| KR | 101500164 B1 | 3/2015 |

* cited by examiner

*Primary Examiner* — Thomas E Worden
*Assistant Examiner* — Tiffany P Ohman
(74) *Attorney, Agent, or Firm* — Mintz Levin Cohn Ferris Glovsky and Popeo, P.C.; Peter F. Corless

(57) ABSTRACT

A coasting control method based on an overspeed response and an eco-friendly vehicle employing the same are provided. The coasting control method includes performing an active coasting control when an event for a section speed enforcement area is determined while a vehicle is traveling to allow the vehicle to pass through the section speed enforcement area based on a vehicle position at an event occurrence time.

10 Claims, 8 Drawing Sheets

COASTING CONTROL METHOD BASED ON OVERSPEED RESPONSE AND ECO-FRIENDLY VEHICLE EMPLOYING THE SAME

CROSS-REFERENCE(S) TO RELATED APPLICATIONS

This application claims priority to Korean Patent Application No. 10-2017-0181102, filed on Dec. 27, 2017, the disclosure of which is incorporated herein by reference in its entirety.

BACKGROUND

Field of the Invention

The present invention relates to a coasting control, and more particularly, to an eco-friendly vehicle in which a coasting guidance function control is performed over an entire section speed enforcement area in which an overspeeding vehicle is checked based on an excessive average vehicle speed.

Description of Related Art

Recently, an eco-friendly vehicle having a motor as a power source has increased a fuel efficiency control range to pursue a further improved fuel efficiency. A vehicle deceleration state is an example of the expansion of the fuel efficiency improvement control region. The vehicle deceleration state occurs when the vehicle is being decelerated, in which a regenerative braking control for converting kinetic energy according to an operation of a brake pedal into electric energy when braking is implemented, according to a road condition other than vehicle braking.

Therefore, fuel efficiency improvement according to the vehicle deceleration state is realized by a coasting control, and the coasting control decelerates the motor to prevent energy waste due to forcible deceleration of the vehicle by the brake pedal in the vehicle deceleration state, to thus further enhance the fuel efficiency improvement. Specifically, the coasting control induces a driver to decelerate the vehicle when a forward deceleration event (e.g., a navigation notification) is generated while the vehicle is traveling to achieve greater fuel efficiency improvement.

Consequently, the eco-friendly vehicle may improve motor utilization for a vehicle deceleration control while enhancing the fuel efficiency improvement with the coasting control in harmony with the regenerative braking control, and additionally, the eco-friendly vehicle may have utilization suitable for generic technology, which is required for an autonomous vehicle, through a motor deceleration control without intervening of the driver.

However, the coasting control is performed only at a start position and an end position other than an intermediate section while the vehicle is traveling in a section speed enforcement area and thus, overspeed enforcement is inevitable. The possibility for overspeed enforcement results from a first possibility of overspeed (e.g., speed greater than a speed limit) due to the absence of a coasting control in the middle of a section speed enforcement area, a second possibility in acceleration due to an accelerator manipulation of a driver in the absence of a coasting control in the middle of a section speed enforcement area, and a third possibility in acceleration due to coasting of a vehicle on a downhill road.

Further, due to the absence of the coasting control in the middle of a section when the vehicle is traveling in the section speed enforcement area, a driver inconvenience occurs in which the driver is required to maintain a vehicle speed by continuously engaging a brake pedal to prevent the possibility of the acceleration due to the coasting of the vehicle on a downhill road.

SUMMARY

An exemplary embodiment of the present invention is directed to a coasting control method based on an overspeed response, which extends a guidance function and a control area to a section start position, a section end position, and an intermediate section position through an active coasting control for the section speed enforcement area together with the coasting control according to occurrence of an event, thereby eliminating the possibility for overspeed enforcement, and specifically, separates the active coasting control into a pass through the section speed enforcement area, an exit in the middle of the section speed enforcement area, and an enter in the middle of the section speed enforcement area, thereby minimizing a limitation on the coasting control, and an eco-friendly vehicle employing the same.

Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, a coasting control method based on an overspeed response may include performing, when an event for a section speed enforcement area is determined by a controller while a vehicle is traveling, an active coasting control for allowing the vehicle to pass through the section speed enforcement area based on a vehicle position at an event occurrence time.

The active coasting control may include determining the event occurrence time, determining the vehicle position using an imaging device (e.g., a camera) detection in the section speed enforcement area, performing one control among a section speed enforcement pass control, a section speed enforcement middle exit control, and a section speed enforcement middle enter control based on the vehicle position and allowing the vehicle to pass through the section speed enforcement area.

The determination of the vehicle position may include determining whether the section speed enforcement area is detected using a section speed enforcement area definer, switching to, when the section speed enforcement area is detected, the active coasting control by an inertial driving controller configured to adjust a vehicle speed based on a hydraulic pressure and a controlled speed, determining a section speed enforcement enter condition by a section speed enforcement enter condition determiner, and determining whether a section speed enforcement camera is detected by a section speed enforcement camera detector.

The performance of one of the controls may include performing, when a section speed enforcement camera is detected, one control among the section speed enforcement pass control, the section speed enforcement middle exit control, and the section speed enforcement middle enter control by a remaining section speed enforcement distance calculator configured to calculate a remaining section speed enforcement distance, and a section speed enforcement pass controller.

The coasting control method may further include switching, when the section speed enforcement area is not detected, the active coasting control to a coasting control. Additionally, the coasting control method may include performing, when the active coasting control is switched to the coasting control, a coasting guidance and the coasting control. When a start camera and an end camera for section speed enforcement are detected, the section speed enforcement pass control may be performed.

Further, the performing of the section speed enforcement pass control may include performing a section start control, performing a section middle control, and performing a section end control. The performing of the section start control may include detecting the start camera, performing a coasting control, and determining whether the vehicle has passed the start camera.

The performing of the section middle control may include determining a controlled vehicle speed, determining whether an accelerator is in an ON state, determining, when the accelerator is determined as being in the ON state, whether a current vehicle speed is greater than the controlled vehicle speed, providing a notification to a coasting guidance when the current vehicle speed is determined to be greater than the controlled vehicle speed, determining whether the current vehicle speed is less than the controlled vehicle speed, calculating, when the current vehicle speed is determined to be less than the controlled vehicle speed, a remaining section speed enforcement distance, and performing the section end control when the remaining section speed enforcement distance is less than a predetermined distance.

The coasting control method may further include calculating, when the current vehicle speed is determined to be less than the controlled vehicle speed, the remaining section speed enforcement distance. When the current vehicle speed is determined to be greater than the controlled vehicle speed, a notification may be provided to the coasting guidance. When the remaining section speed enforcement distance is determined to be greater than the predetermined distance, whether the accelerator is in the ON state may be determined.

The coasting control method may further include providing a notification to a coasting guidance when the accelerator is determined as not being in the ON state calculating a coasting torque, determining whether the coasting torque is greater than a motor tolerable maximum torque, calculating a hydraulic torque when the coasting torque is determined to be greater than the motor tolerable maximum torque, calculating a motor torque, determining whether the current vehicle speed is less than the controlled vehicle speed, calculating the remaining section speed enforcement distance when the current vehicle speed is determined to be less than the controlled vehicle speed, and performing the section end control when the remaining section speed enforcement distance is determined to be less than the predetermined distance.

The coasting control method may further include determining, when the coasting torque is determined to be less than the motor tolerable maximum torque, the motor torque as being the same as the coasting torque, and calculating, when the current vehicle speed is determined to be less than the controlled vehicle speed, the remaining section speed enforcement distance. Additionally, the coasting control method may include providing a notification to the coasting guidance when the current vehicle speed is determined to be greater than the controlled vehicle speed.

The performing of the section end control may include performing the coasting control, determining whether the vehicle has passed the end camera, and terminating the coasting when the vehicle is determined as having passed the end camera. The coasting control method may further include performing the section speed enforcement middle exit control when a start camera for section speed enforcement is detected.

The performing of the section speed enforcement middle exit control may include performing a section start control, performing a section middle control, and performing a section exit control. The performing of the section start control may include detecting the start camera, performing a coasting control, and determining whether the vehicle has passed the start camera.

The performing of the section middle control may include determining a controlled vehicle speed, determining whether an accelerator is in an ON state, determining, when the accelerator is determined as being in the ON state, whether a current vehicle speed is greater than the controlled vehicle speed, providing a notification to a coasting guidance when the current vehicle speed is determined to be greater than the controlled vehicle speed, determining whether the current vehicle speed is less than the controlled vehicle speed, determining, when the current vehicle speed is determined to be less than the control vehicle speed, whether the vehicle has exited from the section speed enforcement area, and performing, when the vehicle has exited from the section speed enforcement area, the section exit control.

The coasting control method may further include determining, when the accelerator is determined to be in an OFF state, whether the current vehicle speed is greater than the controlled vehicle speed, calculating a casting torque when the current vehicle speed is determined to be greater than the controlled vehicle speed, determining whether the coasting torque is greater than a motor tolerable maximum torque, calculating a hydraulic torque when the coasting torque is determined to be greater than the motor tolerable maximum torque, calculating a motor torque, determining whether the current vehicle speed is less than the controlled vehicle speed, determining, when the current vehicle speed is determined to be less than the controlled vehicle speed, whether the vehicle has exited from the section speed enforcement area, and performing, when the vehicle has exited from the section speed enforcement area, the section exit control.

The coasting control method may further include determining, when the current vehicle speed is determined to be less than the controlled vehicle speed, the vehicle has exited from the section speed enforcement area. The coasting control method may further include determining, when the coasting torque is determined to be less than the motor tolerable maximum torque, the motor torque as being the same as the coasting torque, and determining whether the current vehicle speed is less than the controlled vehicle speed.

The coasting control method may further include calculating the coasting torque when the current vehicle speed is to be greater than the controlled vehicle speed the coasting torque. Additionally, the coasting control method may include performing, when an end camera for section speed enforcement is detected, the section speed enforcement middle enter control.

The performing of the section speed enforcement middle enter control may include performing a section enter control, and performing a section end control. The operation performing of the section enter control may include calculating a remaining section speed enforcement distance, determining whether the remaining section speed enforcement distance is greater than a predetermined distance, and performing a coasting control.

The performing of the section end control may include determining whether the vehicle has passed the end camera, and terminating a coasting control. Further, the coasting control method may include switching, when the section speed enforcement camera is not detected, the active coasting control to a coasting control. In accordance with another exemplary embodiment of the present invention, an eco-friendly vehicle may be operated by the above-described coasting control method based on an overspeed response.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
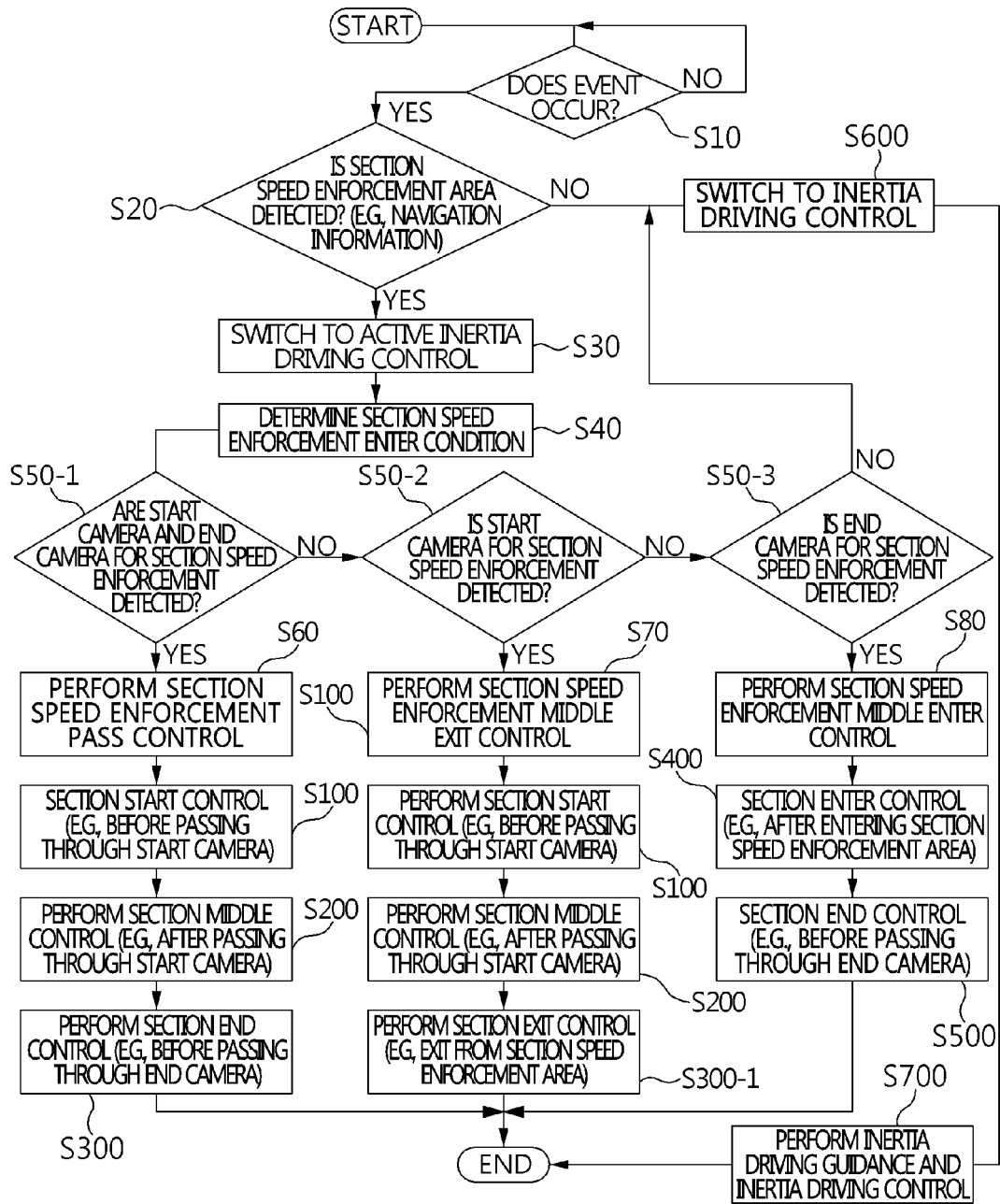
FIG. 1 is a flowchart of a coasting control method based on an overspeed response according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The exemplary embodiments to be described below are provided to facilitate a person skilled in the art to easily understand the technical spirit of the present invention, and thus the present invention is not limited thereto. Further, items shown in the drawings are schematically illustrated so as to easily describe the exemplary embodiments of the present invention, and the items may be different from those actually implemented.

It should be understood that, when a component is referred to as being connected or coupled to other component, the component may be directly connected or coupled to the other component, and another component may be present between the component and the other component. The term "connection" used herein may include a direct connection and an indirect connection between one member and another member, and refer to all physical connections such as adhesion, attachment, engagement, fixing, bonding, and the like. Further, the expressions such as "first," "second," and the like are used only to distinguish a plurality of configurations from each other, and do not limit the order or other features among the configurations.

FIG. 1 illustrates a flowchart of a coasting control method based on an overspeed response according to the present invention. Referring to FIG. 1, when an event for a section speed enforcement area is detected (e.g., a section speed enforcement area is detected) by a controller while a vehicle is being driven (e.g., traveling), the coasting control method based on an overspeed response may perform an active coasting control to allow the vehicle to pass through the section speed enforcement area based on a vehicle position at an event occurrence time. The various components described herein may be operated by an overall controller having a processor and a memory.

The active coasting control may include determining the event occurrence time, identifying the vehicle position by a camera or other imaging device detection in the section speed enforcement area, and performing one control among a section speed enforcement pass control, a section speed enforcement middle exit control, and a section speed enforcement middle enter control based on the vehicle position to allow the vehicle to pass through the section speed enforcement area.

In particular, the determination of the vehicle position may include determining whether the section speed enforcement area is detected by a section speed enforcement area definer, switching to the active coasting control, when the section speed enforcement area is detected, by a coasting controller configured to adjust a vehicle speed based on a hydraulic pressure and a control speed, determining a section speed enforcement enter condition by a section speed enforcement enter condition determiner, and determining whether a section speed enforcement camera is detected by a section speed enforcement camera detector.

Further, the determination of a section speed enforcement enter condition may include performing one control among the section speed enforcement pass control, the section speed enforcement middle exit control, and the section speed enforcement middle enter control, when the section speed enforcement camera is detected, by a section speed enforcement remaining distance calculator configured to calculate a section speed enforcement remaining distance, and a section speed enforcement pass controller.

For example, the method may include determining the event occurrence time (S10), and determining whether the section speed enforcement area is detected based on the navigation information (S20). In particular, when the section speed enforcement area is detected, the method may include switching to the active coasting control (S30), and determining the section speed enforcement enter condition (S40). Further, the method may include determining whether the section speed enforcement camera is detected (S50-1), and, when the section speed enforcement camera is detected, performing the section speed enforcement pass control (S60). The control may be switched to a coasting control (S600) when the section speed enforcement area is not detected, and a coasting guidance and the coasting control (S700) may be performed when the active coasting control is switched to the coasting control, and then the coasting control method may be terminated.

According to the present invention, the performing of the section speed enforcement pass control may include an operation (e100) of performing a section start control (S100), an operation (e200) of performing a section middle control (S200), and an operation (e300) of a section end control (S300). The operation (e100) of the performing of the section start control (S100), the operation (e200) of the performing of the section middle control (S200), and the operation (e300) of the performing of the section end control (S300) will be described in detail below.

Figure 2:
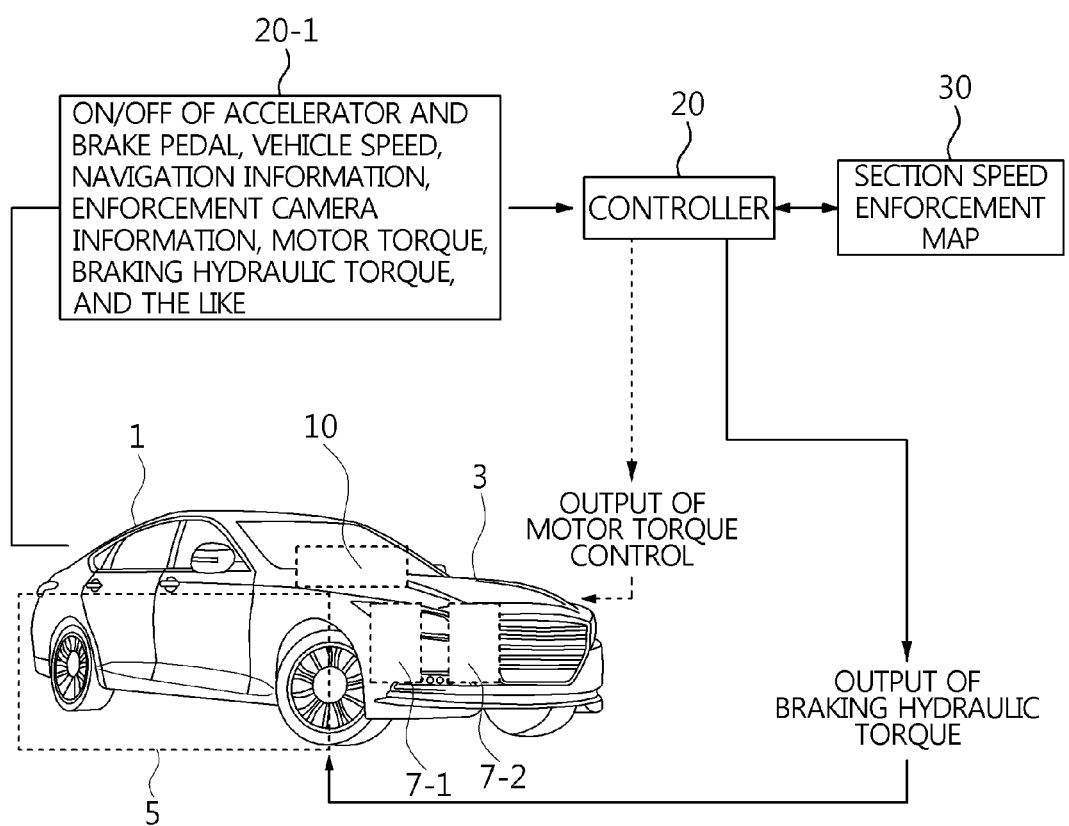
FIG. 2 is an eco-friendly vehicle in which a coasting control based on an overspeed response according to an exemplary embodiment of the present invention is implemented.

Referring to FIG. 2, an eco-friendly vehicle 1 includes a motor 3, a braking system 5, an accelerator pedal 7-1, a brake pedal 7-2, a navigation 10, a controller 20, and a section speed enforcement map 30. The eco-friendly vehicle 1 according to the present invention may include the motor 3, the braking system 5, the accelerator pedal 7-1, the brake pedal 7-2, the navigation 10, and the controller 20.

Particularly, the motor 3 is a power source of the eco-friendly vehicle 1 and operates in conjunction with a micro controller unit (MCU) 40. The braking system 5 includes an integrated brake assist unit (IBAU) (see FIG. 11) to control wheels of the eco-friendly vehicle 1 with a braking hydraulic pressure based on a manipulation of the brake pedal 7-2, and operates in conjunction with an active high beam (AHB) 60. The brake pedal 7-2 includes a brake lamp switch (BLS) engaged by a driver to allow a braking hydraulic pressure to be generated in a hydraulic cylinder and configured to notify a brake manipulation to the exterior of the vehicle, and a brake pedal stroke sensor (BPS) configured to detect a pedal stroke, and the brake pedal 7-2 provides a signal based on the brake manipulation to a hydraulic control unit 30. Therefore, the motor 3, the braking system 5, and the brake pedal 7-2 are conventional components of the eco-friendly vehicle 1.

The navigation 10 provides a guidance for a vehicle driving with road topography information, which distinguishes and classifies a limited vehicle speed based on a road, topographic changes of an interchange (IC), a junction (JC), and a toll gate, and a variation of the vehicle driving in left and right rotations into events, and a driving route setting is performed in the navigation 10. Therefore, the navigation 10 is the same as a conventional navigation installed within a vehicle, but there is a difference in that the navigation 10 operates in conjunction with the controller 20 for the coasting control.

In particular, the controller 20 implements hydraulic cooperative control in cooperation with the braking system 5 through operations of the motor 3 and a brake, and may be configured to calculate deceleration energy, a motor deceleration torque, and a hydraulic braking torque through torque sharing control, determine whether coasting cooperative control is terminated during the coasting control based on termination of coasting limit control and the coasting control, and perform vehicle control, which is subsequent to termination of an inertia driving, through post coasting control.

Figure 3:
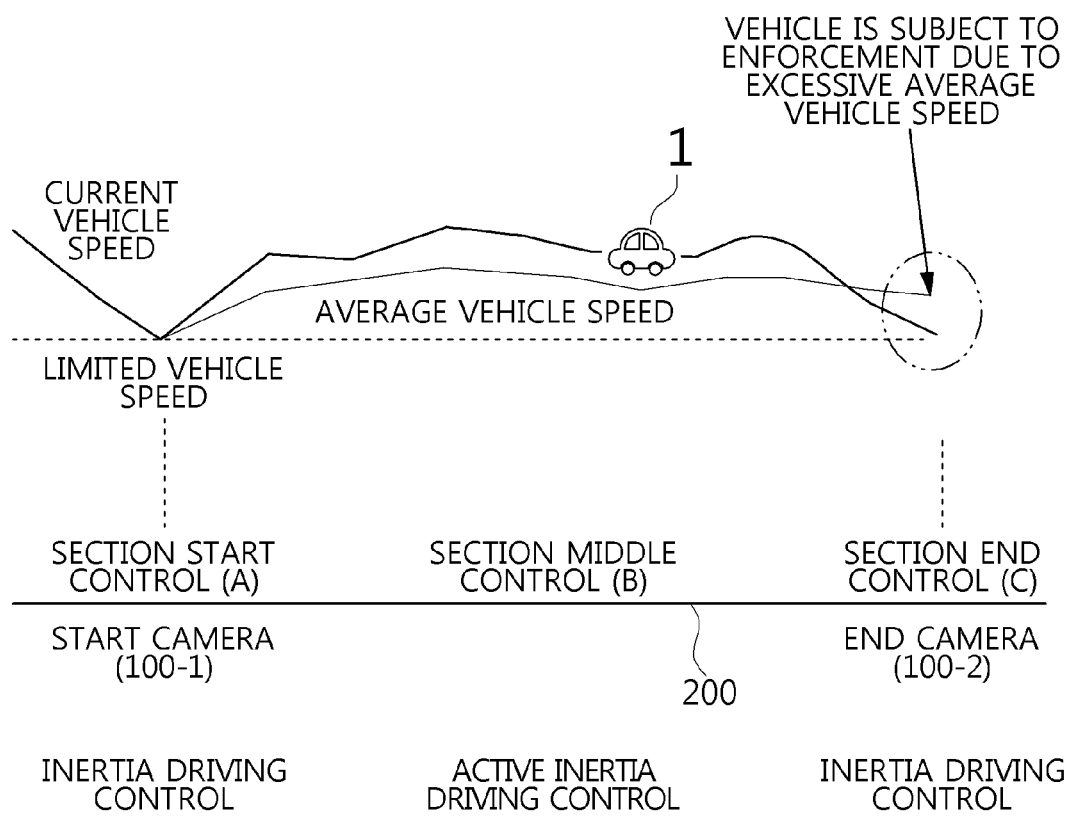
FIG. 3 is a section speed enforcement area to which an active coasting control separated from the coasting control according to an exemplary embodiment of the present invention is applied.

FIG. 3 is an example of the section speed enforcement area to which the active coasting control separated from the coasting control according to the present invention is applied. Referring to FIG. 3, a start camera 100-1 and an end camera 100-2 may be installed as the camera or as another type of imaging device. Generally, overspeed enforcement for the eco-friendly vehicle 1 is performed based on a passing speed of each of the start camera 100-1 and the end camera 100-2 and an average speed between the two cameras 100-1 and 100-2.

In particular, a coasting guidance function may be performed before the eco-friendly vehicle 1 passes through the start camera 100-1 and the end camera 100-2. However, since the inertial driving guidance function is not performed between the start camera 100-1 and the end camera 100-2, when the eco-friendly vehicle 1 is overspeeding by a driver in the section speed enforcement area, the eco-friendly vehicle 1 may be subject to the overspeed enforcement due to an excessive average speed.

Figure 4:
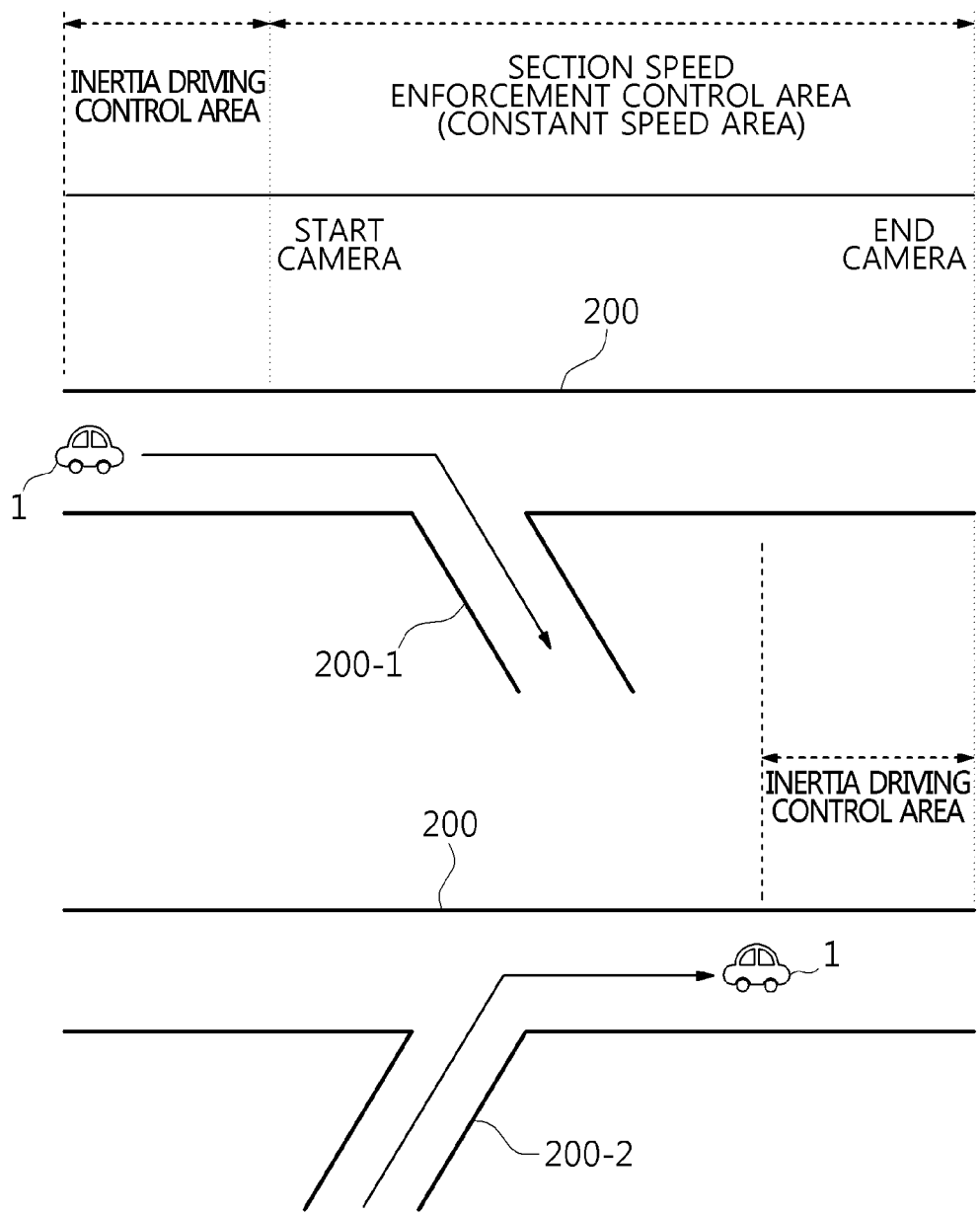
FIG. 4 is an exception rule applied to the active coasting control according to an exemplary embodiment of the present invention.

FIG. 4 is an example of an exception rule applied to the active coasting control according to the present invention. Referring to FIG. 4, validity of the section speed enforcement may be determined, wherein, while the eco-friendly vehicle 1 passes through the section speed enforcement area, a first camera may be defined as a start camera and a second camera may be defined as an end camera. At this position, control which is the same as coasting guidance function control for a general speed camera may be performed until the first camera, and an area between the first camera and the second camera is defined as a validity area of the section speed enforcement.

Further, the section enforcement may be performed on a section speed enforcement road 200, the figures show an exit ramp 200-1 disposed at the section speed enforcement road 200 and an approach ramp 200-2 disposed at the section speed enforcement road 200 are illustrated in the drawing. When the exiting lamp 200-1 is disposed at the section speed enforcement road 200, the eco-friendly vehicle 1 may not pass through the end camera due to using another road in the middle of the section speed enforcement area, and specifically, the first camera may be defined as a speed camera when a section speed enforcement area control is not performed.

Thus, the section speed enforcement area control may be terminated after the eco-friendly vehicle 1 passes through the first camera and thus, there is a possibility of overspeed enforcement when the driver drives the eco-friendly vehicle 1 in a direction toward the end camera irrespective of a driving route. When the section speed enforcement area control is terminated after the eco-friendly vehicle 1 exits the section speed enforcement area, control may be performed the same as being performed when the eco-friendly vehicle 1 passes through the section speed enforcement area and then the control may be terminated after the eco-friendly vehicle 1 exits from the section speed enforcement area.

Furthermore, when the approach ramp 200-2 is disposed at the section speed enforcement road 200, the eco-friendly vehicle 1 enters the middle of the section speed enforcement area, and the coasting control may be performed in front of the end camera without defining an area as the section speed enforcement area.

Figure 5:
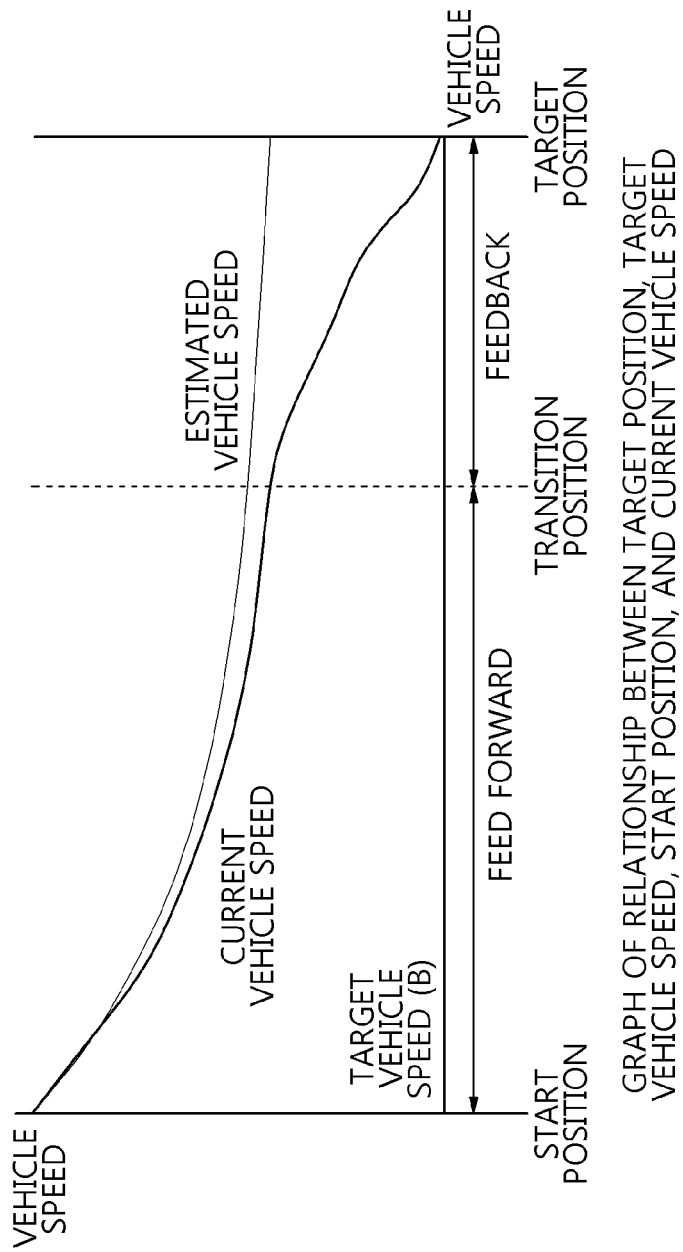
FIG. 5 is a diagram illustrating a relationship between a distance and a vehicle speed, which is applied to the coasting control according to an exemplary embodiment of the present invention.

FIG. 5 is a diagram illustrating a relationship between a distance and a vehicle speed, which is applied to the coasting control according to the present invention. Referring to FIG. 5, a diagram illustrating a relationship between a target position, a target vehicle speed, a start position, and a current vehicle speed. The figure shows that a vehicle speed is gradually decelerated from the start position to a transition position and is reduced substantially at the target position, thereby reaching the target vehicle speed at the target position.

Figure 6:
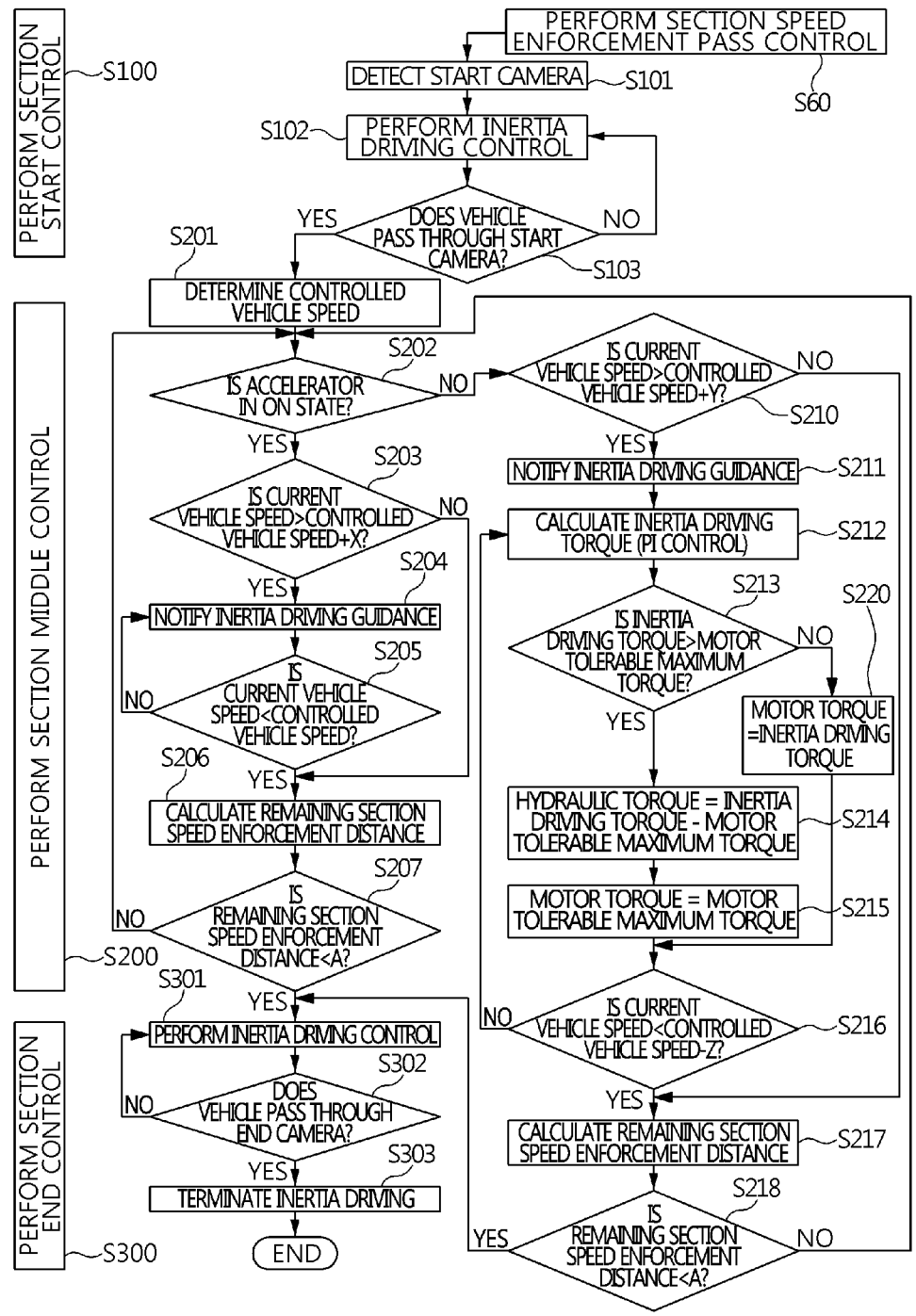
FIG. 6 is a flowchart of a section speed enforcement pass control of the active coasting control according to an exemplary embodiment of the present invention.

FIG. 6 is a flowchart of a section speed enforcement pass control of the active coasting control according to the present invention. Referring to FIG. 6 together with FIG. 1, in the section speed enforcement pass control of the active coasting control according to the present invention, a section speed enforcement control area may be set such that the coasting guidance and creep torque control may be first performed with respect to a coasting control area through the same control for the conventional inertia driving, and a section from the start camera to the end camera may be defined as the section speed enforcement area with respect to the section speed enforcement control area.

Further, a start position with respect to the beginning and termination of section speed enforcement becomes a position of the start camera, and an end position with respect thereto becomes a position of the end camera. In the section speed enforcement pass control of the active coasting control according to the present invention, the coasting control area may be defined as a coasting section from the start camera to a predetermined front position, and the section speed enforcement control area is a section speed enforcement section and may be defined as a section between the start camera and the end camera.

In one example, the performing of the section speed enforcement pass control may include an operation (e100) of performing a section start control (S100), an operation (e200) of performing a section middle control (S200), and an operation (e300) of performing a section end control (S300). The operation (el 00) of the performing of the section start control (S100) may include an operation (e101) of detecting the start camera (S101), an operation (e102) of performing the inertia running control (S102) when the start camera is detected (S101), and an operation (e103) of determining whether the eco-friendly vehicle 1 passes through the start camera (S103).

Further, the operation (e200) of the performing of the section middle control (S200) may include an operation (e201) of determining a controlled vehicle speed (S201), and an operation (e202) of determining whether an accelerator is in an ON state (S202). In particular, when the accelerator is determined as being in the ON state, the operation (e200) may include an operation (e203) of determining whether a current vehicle speed is greater than the controlled vehicle speed (S203), and an operation (e204) of providing a notification to the coasting guidance when the current vehicle speed is determined to be greater than the controlled vehicle speed.

Subsequently, the operation (e200) may include an operation (e205) of determining whether the current vehicle speed is less than the controlled vehicle speed (S205), an operation (e206) of calculating a remaining section speed enforcement distance (S206) when the current vehicle speed is determined to be less than the controlled vehicle speed, and an operation (e207) of determining whether the remaining section speed enforcement distance is less than a predetermined distance (S207).

When the remaining section speed enforcement distance is determined to be less than a predetermined distance, the operation (e300) of the performing of the section end control (S300) may be performed. However, the operation (e206) of the calculating of the remaining section speed enforcement distance (S206) may be performed when the current vehicle speed is determined to be less than the controlled vehicle speed in the operation (e203), and the operation (e204) of providing the notification to the coasting guidance (S204) may be performed when the current vehicle speed is determined to be greater than the controlled vehicle speed in the operation (e205).

Further, unlike the described above, the operation (e202) of the determining whether the accelerator is in the ON state (S202) may be performed when the remaining section speed enforcement distance is determined to be greater than the predetermined distance in the operation (e207), and thus the operation (e200) may include an operation (e210) of determining whether the current vehicle speed is greater than the controlled vehicle speed (S210) when the accelerator is determined as being in the OFF state in the operation (e202), and an operation (e211) of providing a notification to the coasting guidance (S211) when the current vehicle speed is determined to be greater than the controlled vehicle speed.

In particular, when the accelerator is determined as being in the OFF state, the operation (e211) of providing the notification to the coasting guidance (S211) may be performed, and an operation (e212) of calculating a coasting torque (S212) may be performed. Further, the operation (e200) may include an operation (e213) of determining whether the coasting torque is greater than a motor tolerable maximum torque (S213), and an operation (e214) of calculating a hydraulic torque when the coasting torque is determined to be greater than the motor tolerable maximum torque (S214). The hydraulic torque is a torque which may be obtained by subtracting the motor tolerable maximum torque from the coasting torque. Subsequently, the operation (e200) may include an operation (e215) of calculating a motor torque (S215), an operation (e216) of determining whether the current vehicle speed is less than the controlled vehicle speed (S216), and an operation (e217) of calculating the remaining section speed enforcement distance (S217) when the current vehicle speed is determined to be less than the controlled vehicle speed.

The operation (e200) may include an operation (e218) of determining whether the remaining section speed enforcement distance, which is calculated in the operation (e217), is less than a predetermined distance (S218). When the remaining section speed enforcement distance is determined to be less than the predetermined distance, the section end control (S300) may be performed. The section end control (S300) may include performing the coasting control (S301), determining whether the eco-friendly vehicle 1 has passed through the end camera (S302), and then terminating the coasting (S303) when the eco-friendly vehicle 1 is determined as having passed through the end camera. However, when the eco-friendly vehicle 1 is determined as not having passed through the end camera, the coasting control (S301) may be performed continuously.

Moreover, when the coasting torque is determined to be less than the motor tolerable maximum torque (S213) in the operation (e213), the operation (e200) may include an operation (e220) of determining the motor torque as being the same as the coasting torque to perform the operation (e217) of the calculating of the remaining section speed enforcement distance (S217) when the current vehicle speed is determined to be less than the controlled vehicle speed (S216) in the operation (e216). When the current vehicle speed is determined to be greater than the controlled vehicle speed (S210) in the operation (e210), the operation (e211) of providing the notification to the coasting guidance (S211) may be performed. Alternatively, when a section speed enforcement camera is not detected in the operation (c), the active coasting control may be switched to the coasting control (S600) and then the coasting guidance and the coasting control may be performed continuously (S700).

Figure 7:
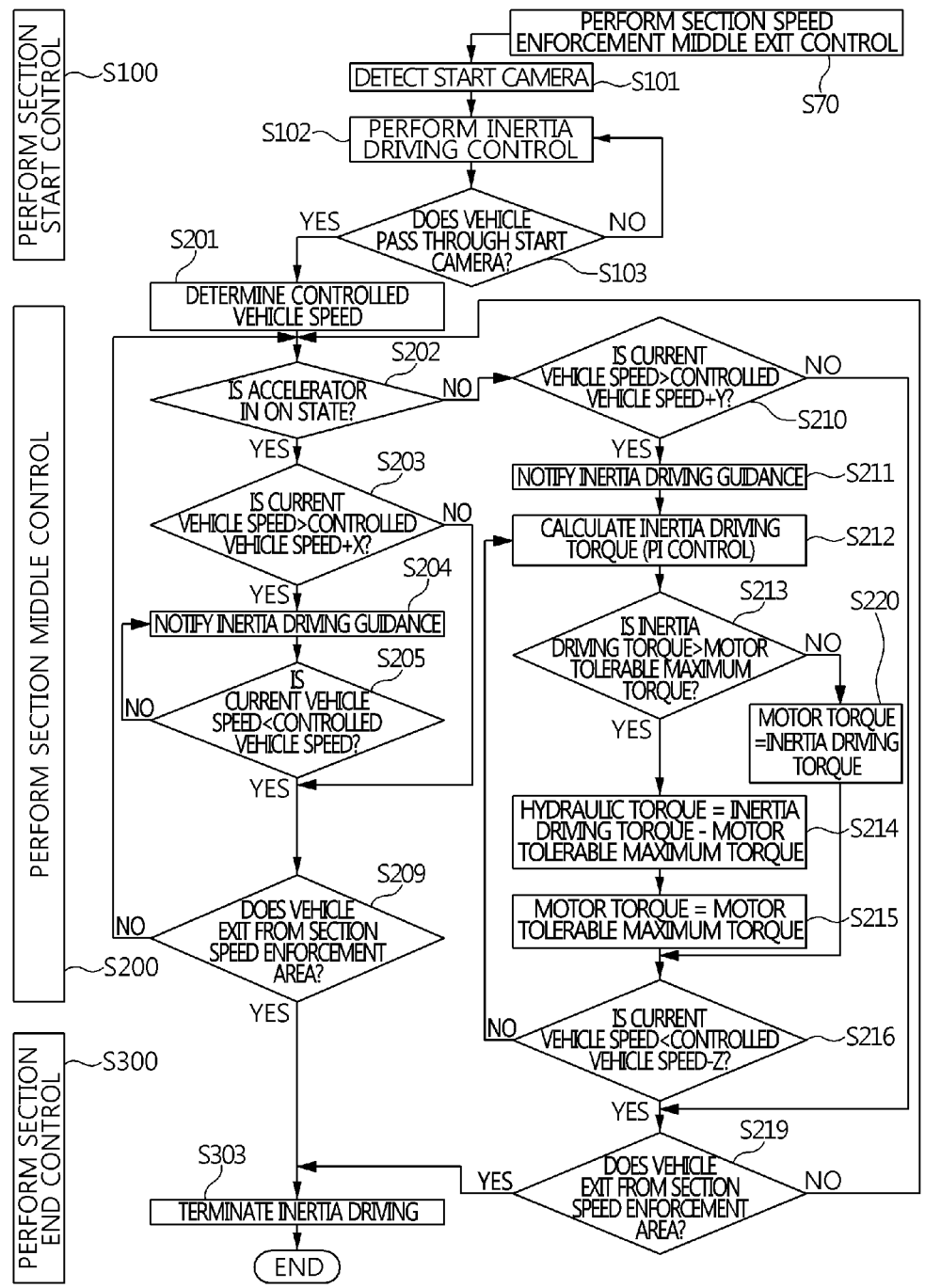
FIG. 7 is a flowchart of a section speed enforcement middle exit control of the active coasting control according to an exemplary embodiment of the present invention.

FIG. 7 is a flowchart of the section speed enforcement middle exit control of the active coasting control according to the present invention. Referring to FIG. 7 together with FIG. 1, the section speed enforcement middle exit control of the active coasting control according to the present invention may be performed with respect to only the start camera when the eco-friendly vehicle 1 does not pass through the end camera due to using another road in the middle of the section speed enforcement area.

In particular, the active coasting control may not be performed in the section speed enforcement area since the eco-friendly vehicle 1 is not subject to overspeed enforcement even when exceeding a regulated speed due to the absence of the end camera from a driving route. In one example, when the start camera for the section speed enforcement is detected (S50-2) in the operation (e), the active coasting control may include an operation (f) of performing the section speed enforcement middle exit control (S70).

The section speed enforcement middle exit control may include an operation (f100) of performing a section start control (S100), an operation (f200) of performing a section middle control (S200), and an operation (f300) of performing a section exit control (S300-1). The operation (f100) of performing the section start control (S100) may include an operation (f101) of detecting the start camera (S101), an operation (f102) of adjusting the inertial driving (S102), and an operation (f103) of determining whether the eco-friendly vehicle 1 has passed the start camera (S103).

Further, subsequent to the operation (f100) of the performing of the section start control (S100), the operation (f200) of the performing of the section middle control (S200) may include an operation (f201) of determining a controlled vehicle speed (S201), and an operation (f202) of determining whether an accelerator is in an ON state (S202). When the accelerator is determined as being in the ON state, the operation (f200) may include an operation (f203) of determining whether the current vehicle speed is greater than the controlled vehicle speed (S203).

When the current vehicle speed is determined to be greater than the controlled vehicle speed, the operation (f200) may include an operation (f204) of providing a notification to the inertial driving guidance (S204) when the current vehicle speed is determined to be greater than the controlled vehicle speed, and an operation (f205) of determining whether the current vehicle speed is less than the controlled vehicle speed (S205). Subsequently, the operation (f200) may include an operation (f206) of determining whether the eco-friendly vehicle 1 has exited from the section speed enforcement area (S209) when the current vehicle speed is determined to be less than the controlled vehicle speed, and an operation (f207) of terminating the coasting (S303) by performing the section exit control (S300-1) when the eco-friendly vehicle 1 is determined as having exited from the section speed enforcement area.

However, in the above-described operation (f202), when the accelerator is determined as being in the OFF state, the operation (f200) may include an operation (f210) of determining whether the current vehicle speed is greater than the controlled vehicle speed (S210). When the current vehicle speed is determined to be greater than the controlled vehicle speed (S210) in the operation (f210), the operation (f200) may include an operation (f211) of providing a notification to a coasting guidance (S211), and an operation (f212) of calculating a coasting torque (S212). Subsequently, the operation (f200) may include an operation (f213) of determining whether the coasting torque is greater than a motor tolerable maximum torque (S213), and an operation (f214) of calculating a hydraulic torque when the coasting torque is determined to be greater than the motor tolerable maximum torque (S214). The hydraulic torque is a torque which may be obtained by subtracting the motor tolerable maximum torque from the coasting torque. Then, the operation (f200) may include an operation (f215) of calculating a motor torque (S215) which is the motor tolerable maximum torque, and an operation (f216) of determining whether the current vehicle speed is less than the controlled vehicle speed (S216).

Subsequently, the operation (f200) may include an operation (f217) of determining whether the eco-friendly vehicle 1 has exited from the section speed enforcement area (S219) when the current vehicle speed is determined to be less than the controlled vehicle speed, and an operation (f218) of terminating the coasting (S303) by performing the section exit control (S300-1) when the eco-friendly vehicle 1 is determined as having exited from the section speed enforcement area.

Furthermore, when the current vehicle speed is determined to be less than the controlled vehicle speed (S216) in the operation (f216), the operation (f217) of the determining whether the eco-friendly vehicle 1 has exited from the section speed enforcement area (S219) may be performed. When the coasting torque is determined to be less than the motor tolerable maximum torque (S213) in the operation (f213), the operation (f200) may include an operation (f220) of determining the motor torque as being the same as the coasting torque (S220), and the section speed enforcement middle exit control may perform the operation (f217) of the determining whether the eco-friendly vehicle 1 has exited from the section speed enforcement area (S219), and the operation (f212) of calculating the coasting torque (S212) when the current vehicle speed is determined to be greater than the controlled vehicle speed (S216) in the operation (f216).

Figure 8:
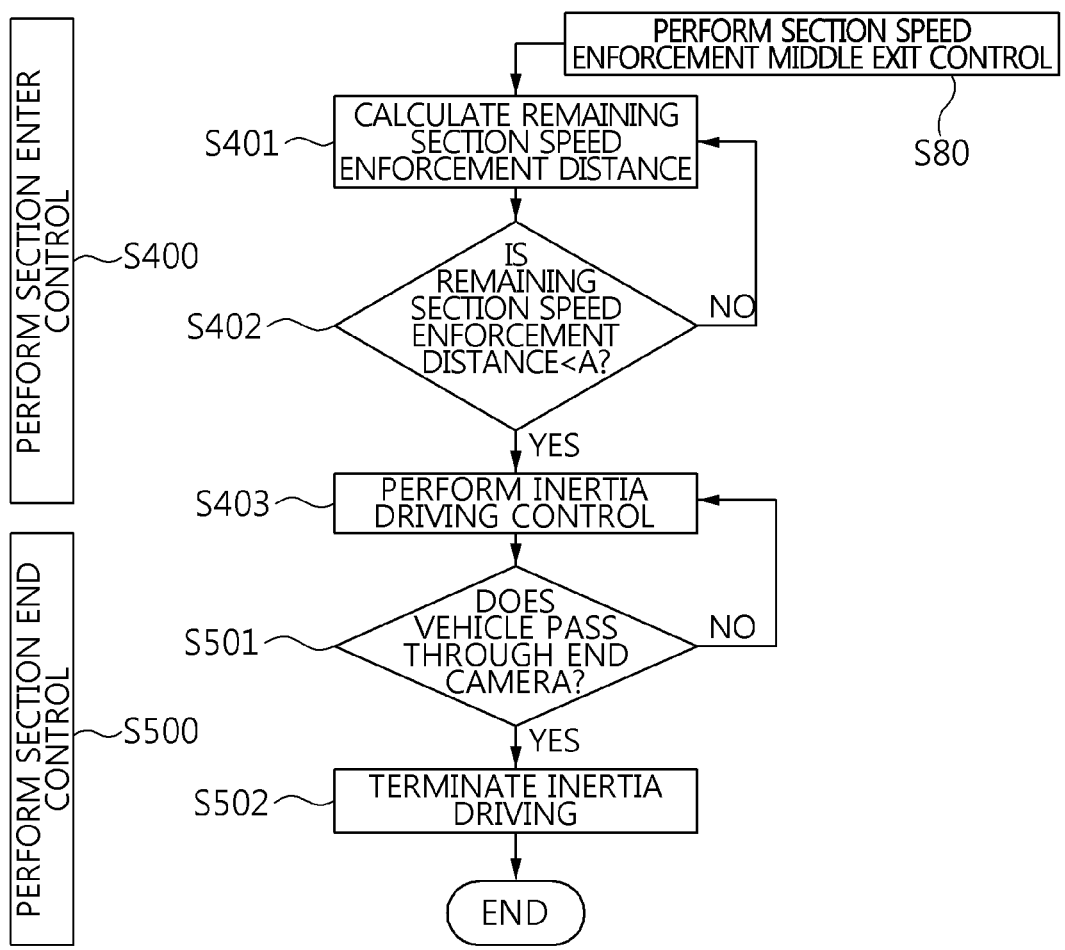
FIG. 8 is a flowchart of a section speed enforcement middle enter control of the active coasting control according to an exemplary embodiment of the present invention.

FIG. 8 is a flowchart of the section speed enforcement middle enter control of the active coasting control according to the present invention. Referring to FIG. 8 together with FIG. 1, the section speed enforcement middle enter control of the active coasting control according to the present invention performs the coasting control in front of the end camera without defining the section speed enforcement area when the eco-friendly vehicle 1 enters the middle of the section speed enforcement area, and alternatively, the section speed enforcement middle enter control may define the section speed enforcement area when the eco-friendly vehicle 1 enters the middle of the section speed enforcement area.

In one example, when the end camera for the section speed enforcement is detected (S50-3) in the operation (e), the active coasting control may include an operation (g) of performing the section speed enforcement middle enter control (S80). The operation (g) of the performing of the section speed enforcement middle enter control (S80) may include an operation (g400) of performing a section enter control (S400), and an operation (g500) of performing a section end control (S500).

In particular, the operation (g400) of the performing of the section enter control (S400) may include an operation (g401) of calculating a remaining section speed enforcement distance (S401), an operation (g402) of determining whether the remaining section speed enforcement distance is greater than a predetermined distance (S402), and an operation (g403) of performing the coasting control (S403). The operation (g500) of the performing of the section end control (S500) may include an operation (g501) of determining whether the eco-friendly vehicle 1 has passed the end camera (S501), and an operation (g502) of terminating the coasting control (S502).

In accordance with exemplary embodiments of the present invention, it may be possible to improve fuel efficiency, accuracy of the coasting guidance function control, reliability of the eco-friendly vehicle, and customer satisfaction thereof. The eco-friendly vehicle according to the present invention may implement the following actions and effects by suitably realizing the coasting guidance function control even when the eco-friendly vehicle is overspeeding in the section speed enforcement area.

First, fuel efficiency may be improved based on prevention of fuel waste due to overspeed of the eco-friendly vehicle by expanding an active coasting guidance function area in the middle of the section speed enforcement area.

Second, a coasting guidance function control may be more accurate by using a coasting guidance function in the section speed enforcement area in which the coasting guidance function is needed for the driver by securing accuracy of an active coasting control.

Third, marketability of the eco-friendly vehicle may be improved due to an increase of the frequency in use of a coasting guidance since the coasting guidance function in the section speed enforcement area may be performed according to anticipation of the driver, and specifically, due to high improvement in customer satisfaction according to a more accurate coasting guidance function control by sharing a torque of the motor and the hydraulic braking.

It will be apparent to those skilled in the art that various changes and modifications may be made without departing from the spirit and scope of the invention. Therefore, it is noted that the above-described exemplary embodiments are merely illustrative of the most preferred embodiments of the present invention to facilitate understanding of the present invention, and the technical spirit of the present invention is not limited or restricted by only the embodiments described herein, and various alternations, additions, and modifications may be made without departing from the technical spirit of the invention, and other equivalent embodiments thereof are possible. The scope of the present invention is defined by the appended claims rather than the detailed description, and it should be construed that all alternations or modifications derived from the meaning and scope of the appended claims and the equivalents thereof fall within the scope of the present invention.

Further, according to the principle in that inventors may properly define concepts of terms to describe their inventions with the best manner, terms or words used herein and the appended claims are defined such that it should not be construed to be limited to the ordinary or dictionary meanings. Furthermore, the order of the configurations described in the above-mentioned process does not always have to be performed in a time-series order, and this process may be included in the scope of the present invention even when the order of the respective constituents and operations is changed, and the gist of the present invention is satisfied.

What is claimed is:

1. A coasting control method comprising:
   determining, by a controller, an event for a section speed enforcement area while a vehicle is being driven, wherein the section speed enforcement area comprises a start camera and an end camera received by the controller; and
   in response to determining the event for the section speed enforcement area, performing, by the controller, an active coasting control for allowing the vehicle to pass through the section speed enforcement area based on a vehicle position at an event occurrence time and based on a remaining section speed enforcement distance, and
   wherein the active coasting control includes:
      determining, by the controller, the event occurrence time;
      determining, by the controller, the vehicle position in relation a start camera position and an end camera position of the section speed enforcement area, wherein the vehicle position is determined to be between the start camera position and the end camera position of the section speed enforcement area;
      calculating, by the controller, the remaining section speed enforcement distance between the vehicle position and the end camera position; and
      performing, by the controller, an active coasting based on the vehicle position at the event occurrence time and based on the remaining section speed enforcement distance.

2. The method of claim 1,
wherein the controller is configured to adjust a vehicle speed based on a hydraulic pressure and a controlled speed.

3. The method of claim 2, further comprising:
terminating, by the controller, the active coasting when at least one of the start camera and the end camera is no longer detected.

4. The method of claim 2,
wherein the active coasting further includes:
determining, by the controller, whether an accelerator is in an ON state;
determining, by the controller, when the accelerator is determined as being in the ON state, whether a current vehicle speed is determined to be greater than the controlled speed;
determining, by the controller, whether the current vehicle speed is less than the controlled speed;
calculating, by the controller, the remaining section speed enforcement distance when the current vehicle speed is determined to be less than the controlled speed; and
performing, by the controller, a section end control when the remaining section speed enforcement distance is less than a predetermined distance, wherein performing the section end control includes:
performing, by the controller, the active coasting;
determining, by the controller, whether the vehicle position is after the end camera position; and
terminating, by the controller, the active coasting when the vehicle position is determined to be after the end camera position.

5. The method of claim 4, further comprising:
providing, by the controller, a notification to a coasting guidance system when the accelerator is determined as being in an OFF state.

6. The method of claim 5, further comprising:
determining, by the controller, a motor torque as being the same as a coasting torque when the coasting torque is determined to be less than a motor tolerable maximum torque in; and
calculating, by the controller, the remaining section speed enforcement distance when the current vehicle speed is determined to be less than the controlled speed.

7. The method of claim 1, wherein performing the active coasting further includes:
determining, by the controller, a controlled speed;
determining, by the controller, whether an accelerator is in an ON state;
determining, by the controller, whether a current vehicle speed is greater than the controlled speed when the accelerator is determined as being in the ON state;
providing, by the controller, a notification to a coasting guidance system when the current vehicle speed is determined to be greater than the controlled speed.

8. The method of claim 7, further comprising:
determining, by the controller, whether the current vehicle speed is greater than the controlled speed when the accelerator is determined as not being in the ON state;
calculating, by the controller, a coasting torque when the current vehicle speed is determined to be greater than the controlled speed;
determining, by the controller, whether the coasting torque is greater than a motor tolerable maximum torque;
calculating, by the controller, a hydraulic torque when the coasting torque is determined to be greater than the motor tolerable maximum torque;
calculating, by the controller, a motor torque;
determining, by the controller, whether the current vehicle speed is less than the controlled speed;
determining, by the controller, whether the vehicle position is after the section speed enforcement area when the current vehicle speed is determined to be less than the controlled speed; and
performing, by the controller, a section end control when the vehicle position is after the section speed enforcement area.

9. The method of claim 1, wherein performing the active coasting further includes:
determining, by the controller, whether the remaining section speed enforcement distance is greater than a predetermined distance; and
performing, by the controller, a coasting control when the remaining section speed enforcement distance is greater than a predetermined distance.

10. The method of claim 8, wherein performing the section end control further includes:
determining, by the controller, whether the vehicle position is after the end camera position; and
terminating, by the controller, the active coasting when the vehicle position is after the end camera position.

* * * * *